Nov. 22, 1955  J. M. MURRAY ET AL  2,724,596
TOOL HOLDING ATTACHMENTS FOR DIE STOCKS
Filed Jan. 6, 1953

INVENTORS:
James M. Murray
BY Thomas J. Murray
Milo B. Stevens & Co.
Attorneys.

United States Patent Office 2,724,596
Patented Nov. 22, 1955

2,724,596

TOOL HOLDING ATTACHMENTS FOR DIE STOCKS

James M. Murray and Thomas J. Murray, Chicago, Ill.

Application January 6, 1953, Serial No. 329,804

3 Claims. (Cl. 279—14)

Our invention relates to novel and useful improvements in tool holding devices of the type used in conjunction with die stocks.

The purpose of the invention is to provide a tool holder for taps, reamers, tap and screw retrievers, etc., of a simple, effective, efficient design, suitable for economical manufacture.

To facilitate description of the device and its functions, we submit and refer to the accompanying drawing, in which—

Figure 1:
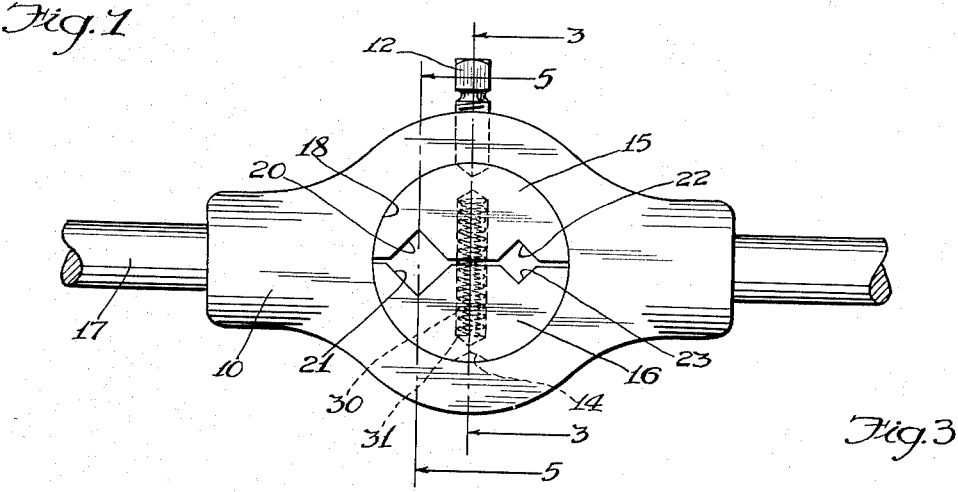
Fig. 1 is a top plan view of the major portion of a die stock, showing the device placed therein.
Figure 5:
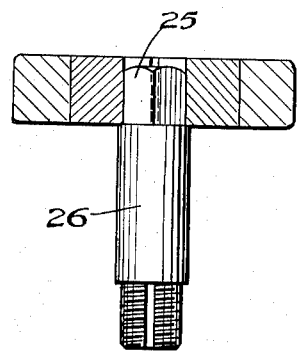
Fig. 5 is a section along line 5—5 of Fig. 1.

Specific reference to the drawing indicates the die stock at 10, its handles at 17, and the conventional set screw for securing the die at 12. The device, shown in the opening 18 of the die stock, Fig. 1, has two jaws 15 and 16. These are indented as indicated at 14, so that the set screw 12 may be applied to either of them. Their opposing faces are normally spaced in reference to each other, and are provided with the angular notches 20 and 21 at one side of center, and similar but smaller notches 22 and 23 on the other side of center. These, with the space between jaws, combine to form adjustable receptacles for the shank 25 of the tool 26 in Fig. 5. The receptacle 20—21 in the open position, and receptacle 22—23 in the closed position, provide the maximum and minimum capacity, respectively, in the range of the tool.

Figure 2:
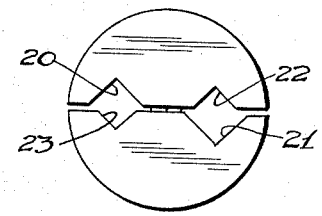
Fig. 2 is a view of the device alone, with one of the jaws reversed.
Figure 3:
Fig. 3 is a section on the line 3—3 of Fig. 1.

The notches and spacing of the jaws are so proportioned in relation to each other that when the jaws 15 and 16 are reversed upon one another, as in Fig. 2, the receptacles provided at 20—23 and at 21—22 will, with their adjustment, complete the continuation of sizes from the maximum to the minimum in the range of the device.

The jaws are united by a coil spring 31 in the bores 30, the end coils of the spring being of a size and/or shape to provide a holding tension in the bores 30, while the rest of the coils are a slip fit in the bores. Thus the jaws are resiliently and pivotally united, the outside dimension on the axis of the spring being somewhat greater than the normal open outside dimension of the device when in the die stock receptacle.

Figure 4:
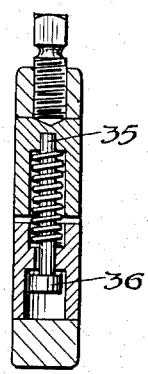
Fig. 4 is a similar view showing a modification.

In the modification shown in Fig. 4 the spring is supplemented by a pin 35 with a head 36. With the plain end of the pin secured in one jaw, the headed end is allowed a suitable amount of movement. The advantage of this construction being to prevent separation of the components by abuse.

In operation, the jaws are gathered from their free position, and inserted in the die stock in their open position; having first been rotated to that relationship which disposes a receptacle of the proper approximate size. The outward thrust of the spring retains the device in place, ready for use. Then the jaws may be tightened upon the tool shank by the turning of the usual set screw.

The device being thus described and illustrated, we recite these advantages inherent in it by reason of its novelty and simplicity:

1. It retains itself in position in the die stock without additional means or devices on said die stock, and is coincidentally self-opening.

2. By distributing the range of movement of the device over a multiplicity of receptacles in a plurality of totally inter-related positions, the movement of the set screw is reduced to such an extent that the radial thrust will not damage the set screw, as occurs in severe service when an undistributed movement is employed.

3. The device is usable in a standard die stock without alteration, addition, or substitution of parts of said die stock.

4. It may be made in a variety of shapes, such as round, square, hexagonal, etc., to fit available die stocks.

5. Being of simple shape and few parts, it is economical to manufacture.

While we have described the invention and a specific modification thereof, we recognize that changes and refinements may be made therein without departing from its principle; and accordingly, reserve the right to employ all such changes and modifications as come within the spirit and scope of the appended claims.

We claim:

1. A tool holding device for use in a die stock comprising a pair of substantially similar members having a multiplicity of cooperating receptacles along their opposing surfaces, said members being adapted to be arranged in said die stock, matching bores in the opposing surfaces of said members substantially on the center line thereof and substantially at right angles to the opposing surfaces, coil spring means seated in said bores for uniting said members and for exerting an outward thrust thereon whereby said members may be rotated relative to each other about said spring means to align receptacles of the desired size.

2. A tool holding device for use in a die stock comprising a pair of opposed reversible members in adjustable spaced proximity having a plurality of cooperating tool engaging surfaces of various capacities along their opposing surfaces, said members being adapted to be arranged in said die stock, said tool engaging surfaces being adaptable to alternately cooperate with each other, matching bores in the opposing surfaces of said members substantially on the center line thereof and substantially at right angles to the opposing surfaces, coil spring means seated in said bores for resiliently uniting said members and for exerting an outward thrust thereon whereby said members may be rotated relative to each other about said spring means to align receptacles of the desired size.

3. A tool holding device for use in a die stock comprising a pair of substantially similar members having a multiplicity of cooperating receptacles along their opposing surfaces, said members being adapted to be arranged in said die stock, matching bores in the opposing surfaces of said members substantially on the center line thereof and substantially at right angles to the opposing surfaces, a pin extending into said bores, a compression coil spring sleeved over said pin and seated in said bores for resiliently uniting said members and for exerting an outward thrust thereon whereby said members may be rotated relative to each other about said pin and spring to align receptacles of the desired size.

References Cited in the file of this patent

UNITED STATES PATENTS

| 530,166 | Dost | Dec. 4, 1894 |
| 1,326,047 | Gradville | Dec. 23, 1919 |
| 1,410,611 | Seillon et al. | Mar. 28, 1922 |

FOREIGN PATENTS

| 525 | Great Britain | Feb. 23, 1870 |